United States Patent
Koh et al.

(10) Patent No.: US 7,139,458 B2
(45) Date of Patent: Nov. 21, 2006

(54) DOUBLE CLAD RARE EARTH DOPED FIBER

(75) Inventors: Joohyun Koh, Painted Post, NY (US); Christine L. Tennent, Campbell, NY (US); Donnell T. Walton, Painted Post, NY (US); Ji Wang, Painted Post, NY (US); Luis A Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/039,041

(22) Filed: Jan. 19, 2005

(65) Prior Publication Data
US 2005/0158006 A1 Jul. 21, 2005

Related U.S. Application Data

(60) Provisional application No. 60/538,372, filed on Jan. 20, 2004.

(51) Int. Cl.
*G02B 6/036* (2006.01)
(52) U.S. Cl. ..................... 385/127; 385/142
(58) Field of Classification Search ........ 385/126–128, 385/142
See application file for complete search history.

(56) References Cited

U.S. PATENT DOCUMENTS

| | | | |
|---|---|---|---|
| 5,949,941 A | 9/1999 | DiGiovanni | 385/127 |
| 5,966,491 A | 10/1999 | DiGiovanni | 385/127 |
| 6,411,762 B1 | 6/2002 | Anthon et al. | 385/123 |
| 6,477,295 B1* | 11/2002 | Lang et al. | 385/31 |
| 6,477,307 B1 | 11/2002 | Tankala et al. | 385/127 |
| 6,483,973 B1 | 11/2002 | Mazzarese et al. | 385/123 |
| 6,779,364 B1 | 8/2004 | Tankala et al. | 65/390 |
| 2002/0197039 A1 | 12/2002 | Carter et al. | 385/127 |
| 2003/0059184 A1 | 3/2003 | Tankala et al. | 385/123 |
| 2005/0117860 A1* | 6/2005 | Vienne et al. | 385/115 |

FOREIGN PATENT DOCUMENTS

| | | |
|---|---|---|
| EP | 0896404 A1 | 7/1998 |
| EP | 1286433 A1 | 6/2002 |

* cited by examiner

*Primary Examiner*—John D. Lee
(74) *Attorney, Agent, or Firm*—Svetlana Z. Short

(57) ABSTRACT

An optical fiber comprising: (i) a silica based, rare earth doped core having a first index of refraction $n_1$; (ii) a silica based inner cladding surrounding the core having a second index of refraction $n_2$, such that $n_1 > n_2$; (iii) a silica based outer cladding surrounding the inner cladding having a third index of refraction $n_3$ such that $n_2 > n_3$, wherein inner cladding diameter is at least 125 μm.

22 Claims, 9 Drawing Sheets

DOUBLE CLAD RARE EARTH DOPED FIBER

This application claims the benefit of priority under 35 U.S.C. § 119(e) of U.S. Provisional Application Ser. No. 60/538,372 filed on Jan. 20, 2004.

This invention was made with Government support under Agreement No. MDA972-02-3-0004 awarded by DARPA. The Government may have certain rights in this invention.

BACKGROUND OF THE INVENTION

1. Field of the Invention

The present invention relates generally to double clad rare earth doped optical fibers, and particularly to all glass rare earth doped optical fibers suitable for use with high power light sources or in optical fiber lasers and optical amplifiers.

2. Technical Background

Optical fiber has become a favorite medium for telecommunications due to its high capacity and immunity to electrical noise. Single clad rare earth doped optical fiber has been widely used in the field of optical amplifiers and fiber lasers. This type of fiber has low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skill in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer. Optical fibers with Yb doped cores and two cladding layers surrounding the core are disclosed, for example, in U.S. Pat. Nos. 6,477,307; 6,483,973; 5,966,491 and 5,949,941.

Double clad optical fiber has been used in applications requiring utilization of optical sources providing between 10 to 100 Watts of optical power, because double clad optical fiber is more efficient in retaining/utilizing optical power provided by the pump than single clad optical fiber. This higher efficiency is due to fiber's utilization of clad-to-core coupling of optical pump power. More specifically, rare-earth doped double clad optical fibers accept light from the optical pump into the inner cladding and then transfer light to the rare-earth doped core through the core-to-inner cladding interface, along the length of the optical fiber. Thus, the optical fiber converts a significant part of the multi-mode light propagated through the inner cladding into a single-mode output at a longer wavelength, by coupling this pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. Cladding pumping can be utilized in fiber amplifiers, or employed to build high-power single mode fiber pump lasers.

The single-stripe broad-area diode laser remains the most efficient and least expensive pump source. Recent progress in semiconductor laser technology has led to creation of a single-stripe multi mode broad-area laser diodes with output powers of more than 10 Watts.

Recent progress in semiconductor laser technology has led to the creation of light sources utilizing either single stripe broad-area laser diodes or laser diode bars, directly coupled to the intermediate fiber incorporated within the light source. The maximum output power of these light sources is more than 150 Watt at a wavelength of 976 nm at the output end of the intermediate fiber. The intermediate fiber diameter and numerical aperture NA of the light source is 200 μm and 0.22, respectively.

In a double-clad laser, an outer cladding of the optical fiber confines the pump light provided by an optical pump in the optical fiber's multi-mode inner cladding. The much smaller cross-sectional area of the optical fiber's core is typically doped with at least one rare-earth element, for example, neodymium or ytterbium, to provide lasing capability in a single-mode output signal. Typically, a neodymium- or ytterbium-doped double-clad fiber is pumped with one or several high-power broad-area diode lasers (at 800 nm or 915 nm) to produce a single transverse mode output (at the neodymium four-level transition of 1060 nm or the ytterbium four level transition of 1030 nm–1120 nm, respectively). Thus, conventional double-clad arrangements facilitate pumping of the fiber using a multi-mode first cladding for accepting and transferring pump energy to a core along the length of the device. Double-clad laser output can also be used to pump a cascaded Raman laser to convert the wavelength to around 1480 nm, which is suitable for pumping erbium.

How much pump light can be coupled into a double-clad fiber's inner cladding depends on the cladding size and numerical aperture NA. As is known, the "etendue" (numerical aperture multiplied by the aperture dimension or spot size) of the inner cladding should be equal to or greater than the etendue of the optical pump for efficient coupling. If the numerical aperture and spot size of the optical source (optical pump are) be different in both axes, in order to have better coupling efficiency, the etendue of the inner cladding should be maintained or exceed that of the pump in both the x and y directions.

Typically, a high numerical aperture NA of the inner cladding, which is related to the difference in refractive index between the inner and outer cladding, is desired. In the well-known design, the first clad layer (inner cladding) is made of glass and the second layer (outer cladding) is made of plastic (for example, fluorinated polymer) with relatively low refractive index in order to increase the numerical aperture NA of the inner cladding. Such plastic may not have the desired thermal stability for many applications, may delaminate from the first cladding, and may be susceptible to moisture damage. In addition, this type of double clad optical fiber may be suitable only for sustained use with relatively low power (lower than 20 Watts) optical sources. When high power sources (more than 100 Watts) are utilized, this type of optical fiber heats and the polymer material of the outer cladding layer carbonizes or burns, resulting in device failure, especially when the fiber is bent. At medium powers (20 Watts to below 100 Watts), the polymer outer cladding ages relatively quickly, losing its mechanical and optical characteristics and becoming brittle, thus shortening the device life.

All-glass, Yb doped optical fibers are also known. An example of such fiber is disclosed in U.S. Pat. No. 6,411,762. The disclosed fiber, however, is not suitable for high power applications because it has a relatively low outer cladding diameter and NA, and therefore, low coupling efficiency due to light leakage outside of the optical fiber. That is, a relatively large portion of the light does not enter the optical fiber and is lost. Although this may not be an issue in applications when only a small amount of optical power needs to be coupled into the fiber, such fiber is not efficient for high power applications when the light source power is 100 Watts or more.

SUMMARY OF THE INVENTION

According to one aspect of the invention an optical fiber comprises: (i) a silica based, rare earth doped core having a first index of refraction $n_1$; (ii) a silica based inner cladding surrounding the core having a second index of refraction $n_2$, such that $n_1 > n_2$; (iii) a silica based outer cladding surrounding the first cladding having a third index of refraction $n_3$, such that $n_2 > n_3$, wherein the inner cladding diameter is at least 125 μm.

According to an embodiment of the present invention, the core is doped with Yb or another rare earth element. The core diameter is about 5 μm to 20 μm, the inner cladding diameter is about 125 μm to 350 μm and the outer cladding diameter is about 145 μm to 500 μm. The index lowering dopant of the outer cladding includes fluorine and/or boron; and the core preferably includes, in weight percent:

| | |
|---|---|
| Rare earth | 0.1 to 2.5 wt %; |
| P | 0 to 5 wt %; |
| Al | 0 to 10 wt %; |
| Ge | 0 to 15 wt %; and |
| F | 0 to 1 wt %. |

Some of the advantages the optical fibers of the present invention are: high coupling efficiency, suitability for high optical power applications (100 Watts or higher), and suitability for use as polarization maintaining fiber and long deployment life.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
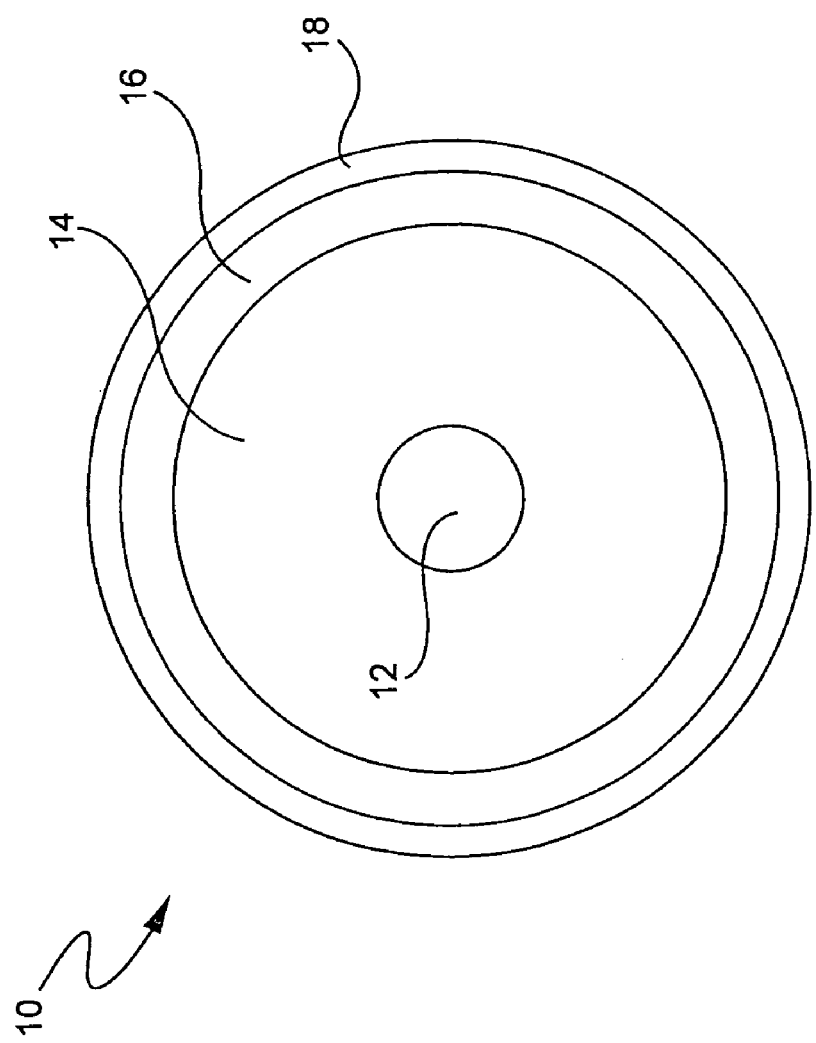
FIG. 1 is a schematic cross-sectional view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of the double clad optical fiber of the present invention is shown schematically in FIG. 1, and is designated generally throughout by the reference numeral 10. The optical fiber 10 illustrated in FIG. 1 includes: a silica based, rare earth doped core 12 having a first index of refraction $n_1$; a first silica based cladding 14 surrounding the core and having a second index of refraction $n_2$, such that $n_1 > n_2$; a silica based outer cladding 16 surrounding the first cladding and having a third index of refraction $n_3$. The core 12, inner cladding 14 and the outer cladding 16 are made of glass. A protective coating 18 surrounds the outer cladding 16. The outer coating 18 may be, for example, an organic coating.

In this embodiment the silica based core 12 is doped with Yb, but other rare earth materials, such as Er may also be utilized. The core 12 may also include at least one index raising dopant. The outer cladding further includes an index lowering dopant, such that $n_2 > n_3$, wherein inner cladding diameter $D_{IN}$ is at least 125 μm. Applicants discovered that the thick inner cladding and all-glass construction of the optical fiber work in synergy to allow the optical fiber to be coupled to high energy source, and to couple the high power into the core without damaging the optical fiber. Thus, such fiber is especially suitable for high power applications.

It is preferable that the outer cladding 16 be relatively thin, with wall thickness less than 80 μm and preferably between about 5 μm and 35 μm. It is most preferable that the wall thickness of the outer cladding 16 be between about 10 μm to 25 μm. It is preferable that the diameter $D_C$ of the fiber core 12 be about 5 μm to 20 μm, the inner cladding diameter $D_{IN}$ be about 125 μm to 2000 μm and more preferably about 125 μm to 1500 μm. It is even more preferable that $D_{IN}$ be about 125 μm to 350 μm. It is preferable that the diameter of the outer cladding diameter ($D_{OUT}$) be about 145 to 2100 μm, more preferably between about 145 μm to 1600 μm and even more preferable that $D_{OUT}$ be about 145 μm to 500 μm. If the inner cladding 14 does not have a circular cross section, Din is defined as the smallest distance from one side of the inner cladding's crossection to the oppositely situated side of the crossection. It is also noted that the outer cladding may not be circular. If the outer cladding is not circular, $D_{out}$ is defined as the smallest distance from one side of the outer cladding's crossection to the oppositely situated side of the outer cladding's crossection.

It is preferable that the inner cladding's cross-sectional area be at least 200 times larger than the cross sectional area of the core 12. It is even more preferable that the cross sectional area of the inner cladding 14 be between 300 and 3000 times larger than the cross sectional area of the core 12.

For example, the cross sectional area of the inner cladding 16 may be 500, 700, 1000, 1200, 1500, 1600, 2000 or 2500 times larger than the cross sectional area of the core 12.

According to this embodiment, the fiber core 12 includes, in weight percent:

| | |
|---|---|
| Rare earth | 0.1 to 2.5 wt %; |
| P | 0 to 5 wt %; |
| Al | 0.5 to 15 wt %; |
| Ge | 0 to 15 wt %; |
| F | 0 to 1 wt %. |

The rare earth dopants in the fiber core 12 provide active ions to enable either a gain or a lasing action. Exemplary rare earth dopants are Yb, Er, Nd, Tm, Sm and Tb. It is preferable that the amount of rare earth dopant in the core 12 be 0.5 wt % to 1.5 wt %. Phosphorus may be added to the core materials in order to lower the softening temperature of the core glass, which may be advantageous if the core is produced by the inside vapor deposition process (described below). Phosphorus may also be utilized as a refractive index raising agent. However too much phosphorus (10% or more) provides nonlinearity through Stimulated Raman Scattering which may inhibit the lasing action. Aluminum may be added to the core as a de-clustering agent (for example, to de-cluster Yb, preferably at the ratio of Al to Yb of 5:1 to 10:1). The core 12 may also include Germanium which is an index raising dopant, and/or fluorine which is an index lowering dopant as well as a de-clustering agent It is preferable that the inner cladding 14 contain 5wt % to 20 wt % Ge to in order to provide high NA It is preferable that the index lowering dopant of the outer cladding 16 comprises Fluorine and/or Boron in weight percent:

| | |
|---|---|
| F | 0 to 4 wt %; |
| B | 0 to 20 wt %. |

The amount of dopant(s) for the outer cladding 16 is chosen to preferably result in inner cladding NA of between 0.15 to 0.5.

Other embodiments of the double clad optical fiber of the present invention are shown schematically in FIGS. 2A–2I and are generally described and depicted herein with reference to several exemplary or representative embodiments with the same numbers referenced to the same or functionally similar parts. The optical fiber cross sections depicted in FIGS. 2A–2I are similar to the optical fiber cross section depicted in FIG. 1, but have non-circular inner claddings 14. The advantage of non-circular inner cladding 14 is that non-circular shape improves the absorption of optical pump power into the core 12.

Figure 3:
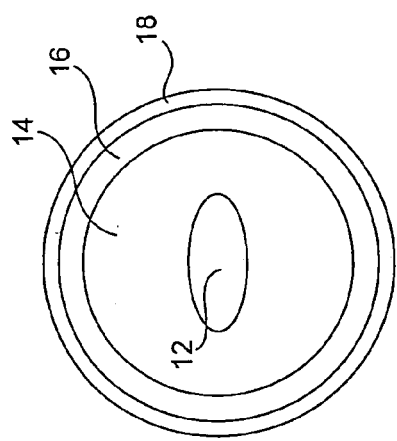
FIG. 3 is a schematic cross-sectional view of yet another embodiment of the present invention.

The optical fiber core 12 is either circular, or elliptical, as shown in FIG. 3. An optical fiber with a circular core 12 is illustrated in FIG. 1. An elliptical core 12 may be preferred because it renders polarization maintaining properties to the optical fiber. It is preferred that the aspect ratio of the elliptical core 12 be at least 1.5:1 and more preferably be between 2:1 and 5:1, because these aspect ratios improve birefringence of the core 12. An optical fiber with an elliptical core having a 2:1 ratio (ratio of major to minor axis) is depicted in FIG. 3. Thus, the optical fiber is polarization maintaining (PM) fiber if the rare earth doped core has an elliptical shape. A Yb-doped core will laze at 1.03–1.11 micron range.

In order to have polarization maintaining single mode fiber, the core 12 has an aspect ratio of at least 1.5 to 1 and a numerical aperture NA between 0.05 (for high power laser application) and 0.25 (for lower power application). The numerical aperture NA of the core 12 is defined as $(N1^2-N2^2)^{1/2}$. If the core 12 is not circular, it is preferable that the aspect ratio of the core be between 3:1 and 10:1.

Figure 2:
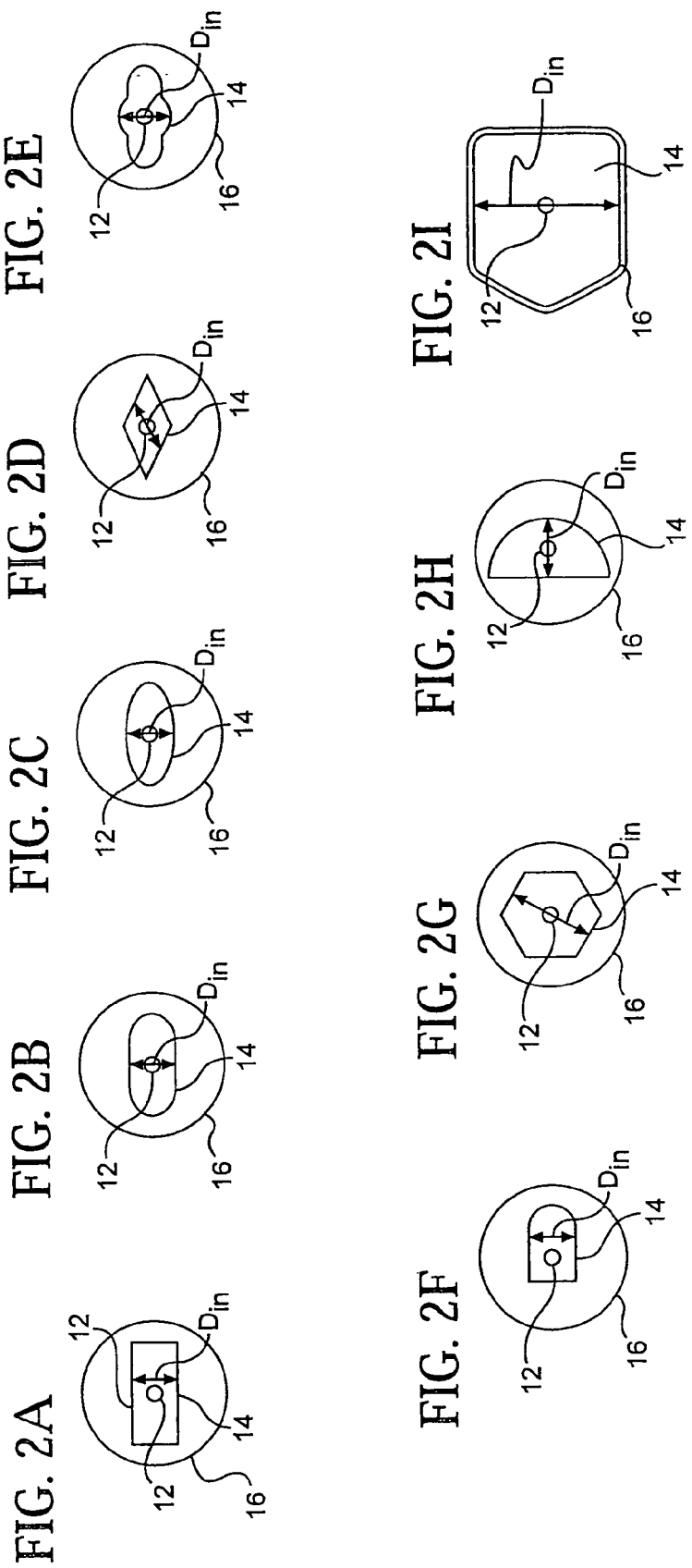
FIG. 2A–2I is a schematic cross-sectional view of other embodiments of the present invention.

The silica based inner cladding 14 may have a circular outer perimeter, as shown in FIG. 1 (preferably with an off-center situated core), or a non-circular outer perimeter as shown in FIG. 2. The numerical aperture NA of the pumped inner cladding is defined as $(N2^2-N3^2)^{1/2}$. The inner cladding preferably has numerical aperture NA between 0.15 and 0.45 and more preferably between 0.3 and 0.4.

In general, a double-clad structure that could be used in a fiber laser or in an amplifier includes two claddings. A first (inner) multi-mode cladding acts as a multi-mode pumping core. The inner cladding is adjacent to the core and a second (outer) cladding surrounds the first cladding. The core 12 may be either single mode or multi mode at the core lasing wavelength. The inner cladding 14 serves as a waveguide with a high numerical aperture NA for the input (pumping) light. The larger the inner cladding diameter, the more pump light is coupled into the inner cladding from the optical source. The cross-section of the first multi-mode inner cladding ($D_{IN}$ is the shorter dimension of the inner cladding as seen in FIGS. 2A–2I) may be designed to have a desired shape, e.g., matched to the near field shape of the pump source or have any other which increases coupling efficiency of the (pump) light from the light source to the inner cladding. The numerical aperture of the inner cladding must be high enough to capture the output of the light source, such as the laser diode.

Recent progress in semiconductor laser technology has led to the creation of light sources utilizing discrete or arrayed broad-area laser diodes coupled to the intermediate fiber incorporated within the light source. The output power of this light source is more than 150 Watt at 976 nm at the output end of the intermediate fiber. The diameter of the intermediate fiber and NA of light source is 200 μm and 0.22 NA, respectively.

The light from this light source is then coupled to a double clad optical fiber via high NA and large aperture lenses. With this approach one can obtain 85–90% of coupling efficiency.

EXAMPLES

The invention will be further clarified by the following examples.

Example 1

Figure 4:
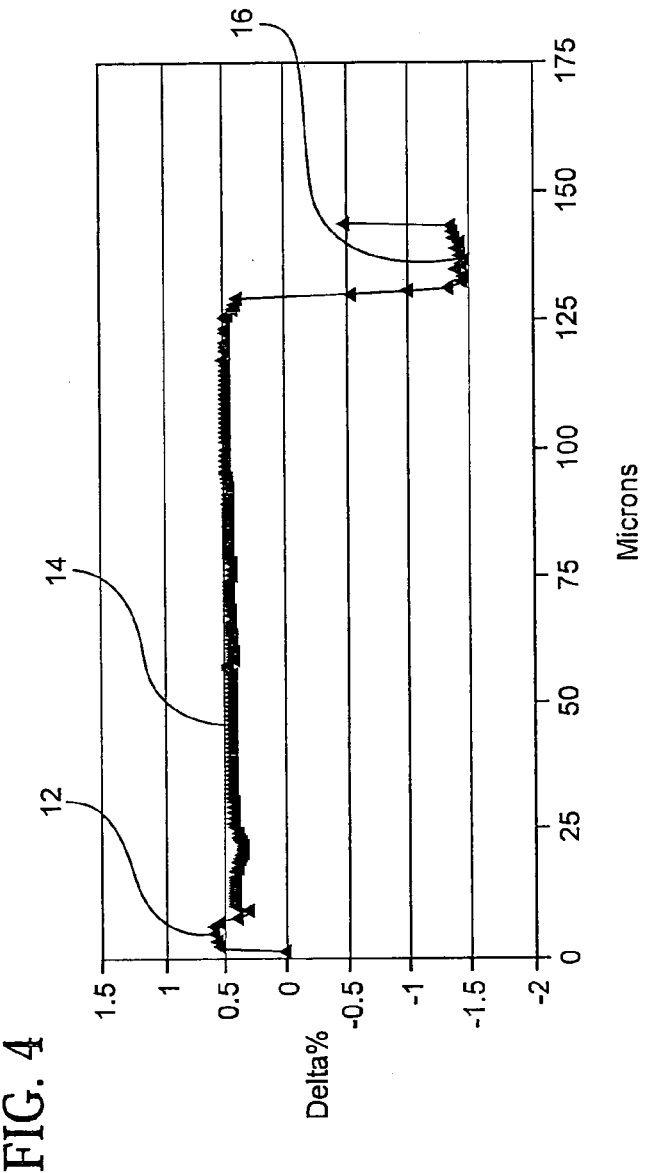
FIG. 4 is a refractive index profile of a first example of the optical fiber of the present invention.

FIG. 4 illustrates a refractive index profile of a first exemplary optical fiber of the present invention. This optical fiber has the cross-section illustrated in FIG. 2I. The distance $D_{IN}$ between two opposing flat sides of this inner cladding crossection is 260 μm. FIG. 4 depicts this optical fiber's refractive index percent delta (relative to that of the pure silica) vs. the distance measured from the core center. The refractive index percent delta is defined herein as $(n_i^2-n_S^2)/2n_i^2$, where i=1, 2 or 3 and $n_S$ is the refractive index of pure silica. This optical fiber has a Yb doped core 12, a Ge-silica inner cladding (% delta≈0.46) and an outer cladding 16 which doped with Fluorine and Boron. FIG. 4 shows that the relative refractive index difference (percent delta) of the core 12 is about 0.56, that the fluorine/boron doped outer cladding 16 has the refractive index percent delta of about −1.4. The Yb-doped fiber core is single-mode for the wavelengths above 1 µm. If the core 12 is doped with Erbium, the optical fiber will be single-mode at lasing wavelength of 1.55 µm. The optical fiber 10 has a relatively low NA (about 0.065) for the core 12, and high NA (0.30) for the inner cladding 14. (The NA is defined by $(n_i^2-n_{i+1}^2)^{1/2}$.) This inner cladding NA is preferably higher than that of the pump-source, allowing high coupling efficiency for the pump light of 90% or better. The small core NA (0.065) enables single mode operation with a large core size (10.5 microns diameter). If the core NA is higher (0.13, for example), the core diameter would have to be smaller (about 5 microns, for example) in order to be single mode. The bigger core diameter and lower core NA allows the core 12 to stay single-mode, while allowing the core to take more pump-power from the inner cladding, and also increases fiber power handling capability. The specific composition for this exemplary optical fiber is:

Core 12: 0.6wt % $Yb_2O_3$; 4.5wt % $AL_2O_3$; 3.0 wt % $GeO_2$;
Inner cladding 14: 8.5 wt % $GeO_2$;
Outer cladding 16: 9 wt % B and 2.7 wt % F.

The fiber of FIG. 4 was produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making fiber soot-preform. The soot-preform is then consolidated into solid transparent glass in a high temperature furnace, after the bait rod is removed. The core/innercladding/outercladding compositons are achieved by utilizing different vapor-ingredients for each of the layers in the soot prerform forming process. The core/inner cladding performs is generated first, then consolidated, followed by an overclad outside vapor deposition process and then consolidated again. The final preform is then drawn into double-clad optical fiber by known fiber-drawing method.

Figure 5:
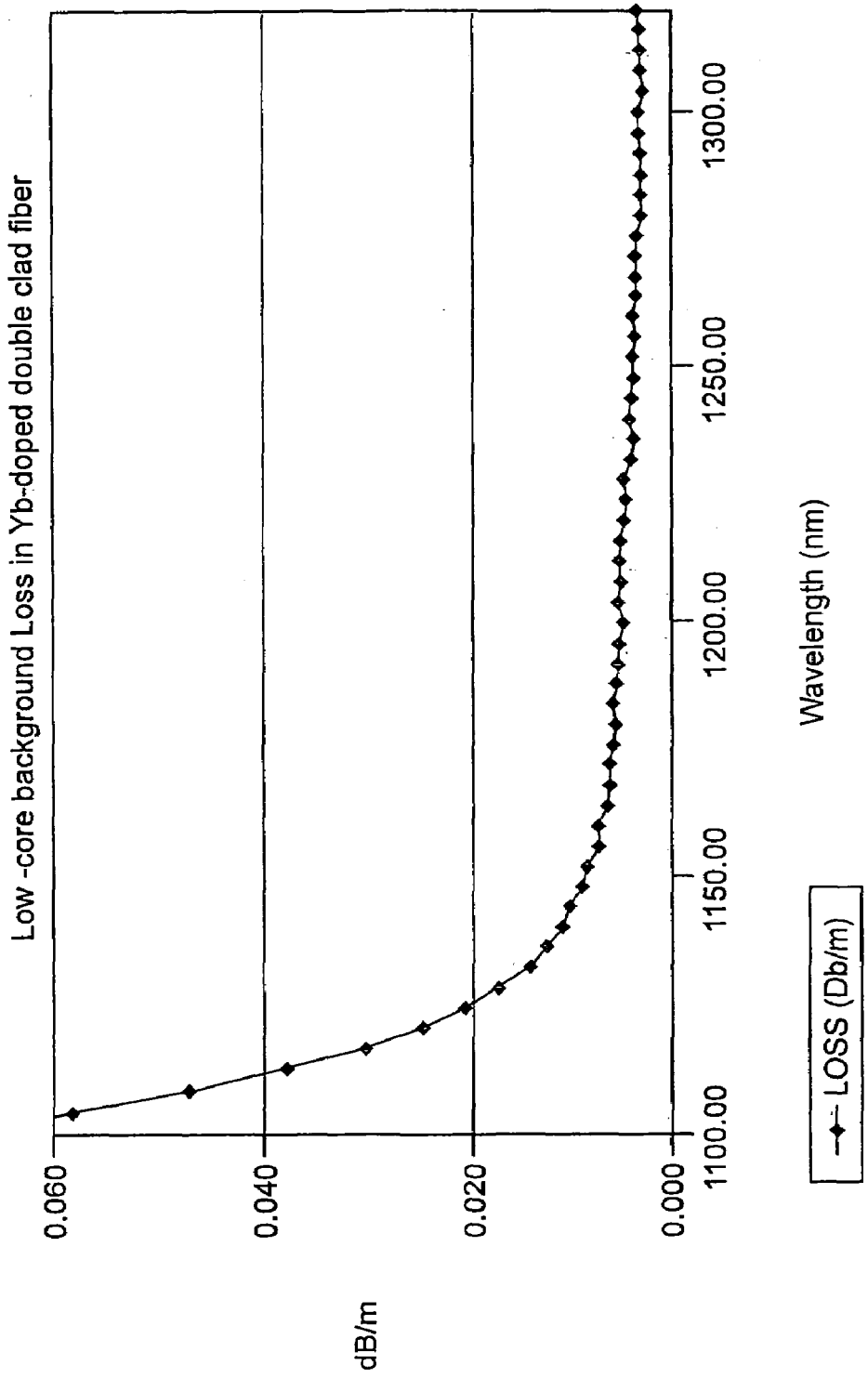
FIG. 5 is a graph illustrating passive core loss vs. wavelength of the optical fiber of FIG. 4.
Figure 6:
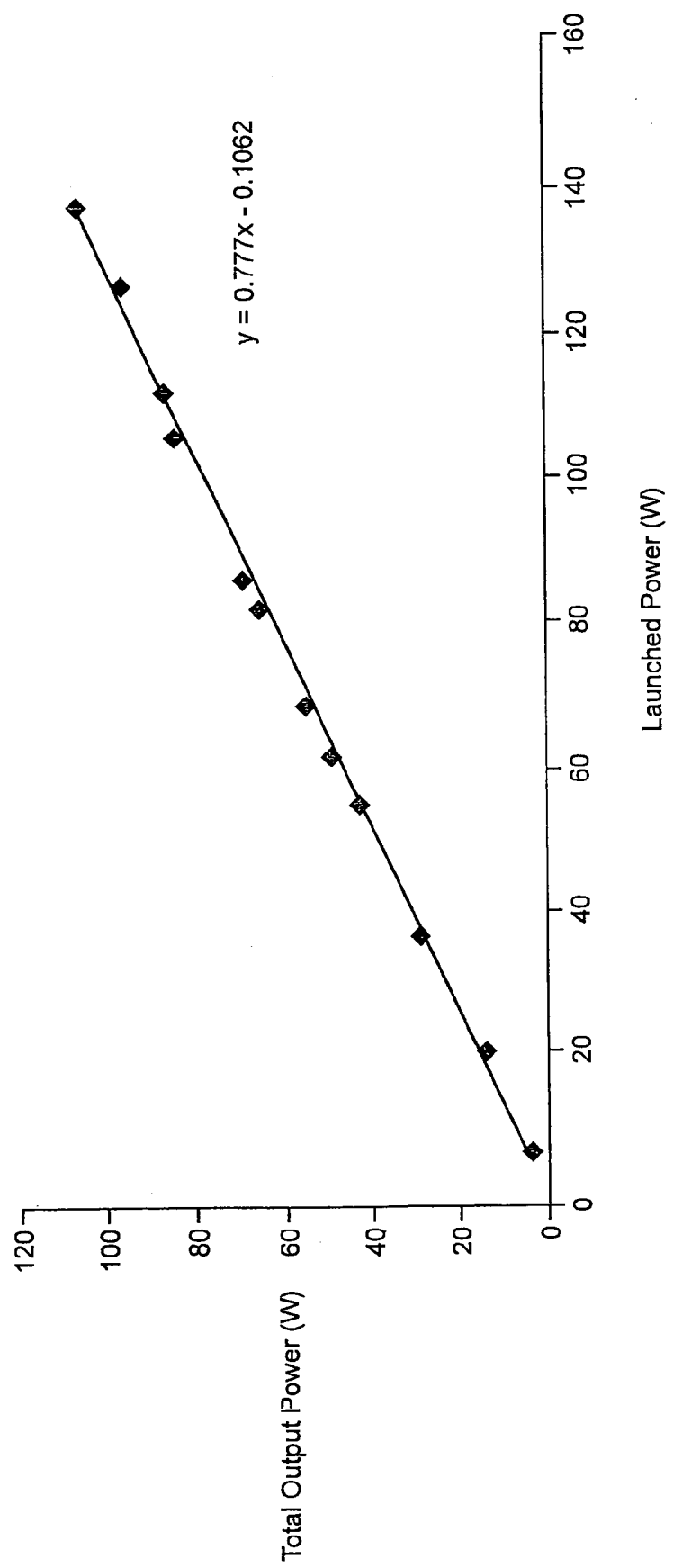
FIG. 6 is a graph of output power vs. lunched power for the optical fiber of FIG. 4.

The double clad fiber produced by the OVD process is especially suitable for use in a higher power fiber laser device. FIGS. 5 and 6 correspond to the optical fiber of FIG. 4. More specifically, FIG. 5 illustrates the low passive loss, for example 3 dB/km at 1280 nm, achieved in the Yb-doped core of the fiber of FIG. 4. The passive loss of the core (also referred to as a background loss) is the inherent loss from the core materials without the absorption-effect from the active dopants such as Yb or Er etc. FIG. 6 illustrates the single mode fiber-laser efficiency of this fiber. More specifically, FIG. 6 is a graph of output power (Watts) versus input power (Watts). The optical pump wavelength is 976 nm. The optical pump is fiber coupled semiconductor laser diode bars (Ga-As/InGaAs). The output from this optical pump was launched into the inner core of the double clad optical fiber of FIG. 4. The fiber laser shows low threshold and high lasing efficiency of 78% (which is defined by the graph's slope). The fiber has good power-handling capability and operates well with optical sources that provide optical (pump) power of over 110 Watts. The optical fiber 10 of this example has absorption per unit length (when launching pump power in the inner cladding) in the range of 0.1–2 dB/m.

Example 2

Figure 7:
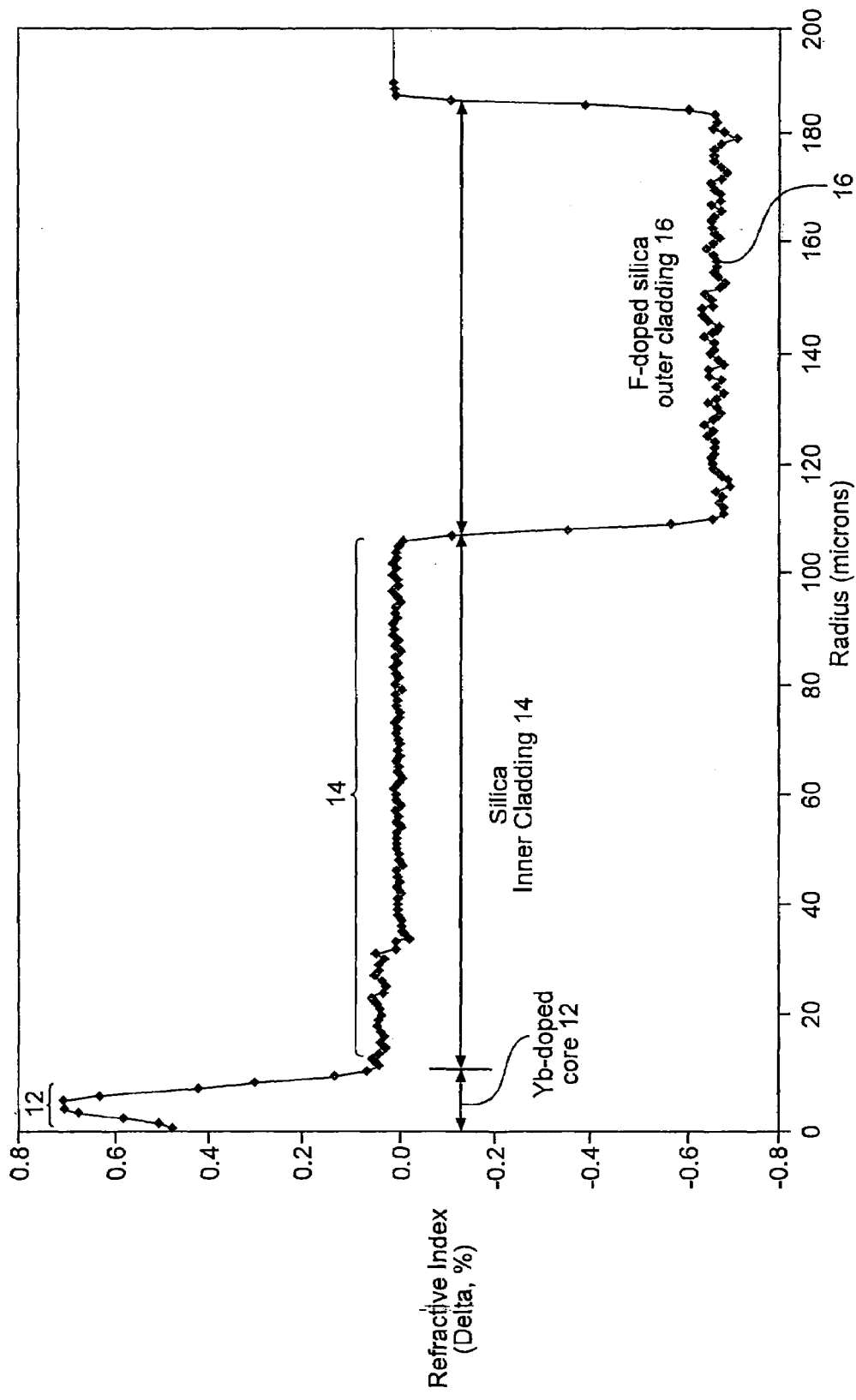
FIG. 7 is a refractive index profile of a second example of the optical fiber of the present invention.

FIG. 7 illustrates a refractive index profile of a second exemplary optical fiber of the present invention. More specifically, FIG. 7 depicts refractive index delta as vs. the radius for the second exemplary optical fiber. This optical fiber has a Yb doped, silica based core 12 which is multi mode at the lasing wavelength of 1100 µm, a silica based inner cladding 14 having two sections of almost the same index of refraction (delta %≈0) and an outer cladding 16 which is doped with fluorine. The NA of the inner cladding is 0.16. FIG. 7 illustrates that the refractive index difference (delta %) of the core 12 is about 0.7, that the fluorine doped outer cladding 16 has the refractive index delta of about −0.7. The core 12 and the first section of the inner cladding 14 are produced by an inside-vapor-deposition (IVD) process. The core Ge-Si soot is deposited inside the glass tube (first section of the inner cladding) and followed by solution Yb-doping of the core soot. The structure is then sintered into a solid preform. The preform is then used as a bait-rod for the OVD process for the additional inner cladding and outer cladding deposition.

Figure 8:
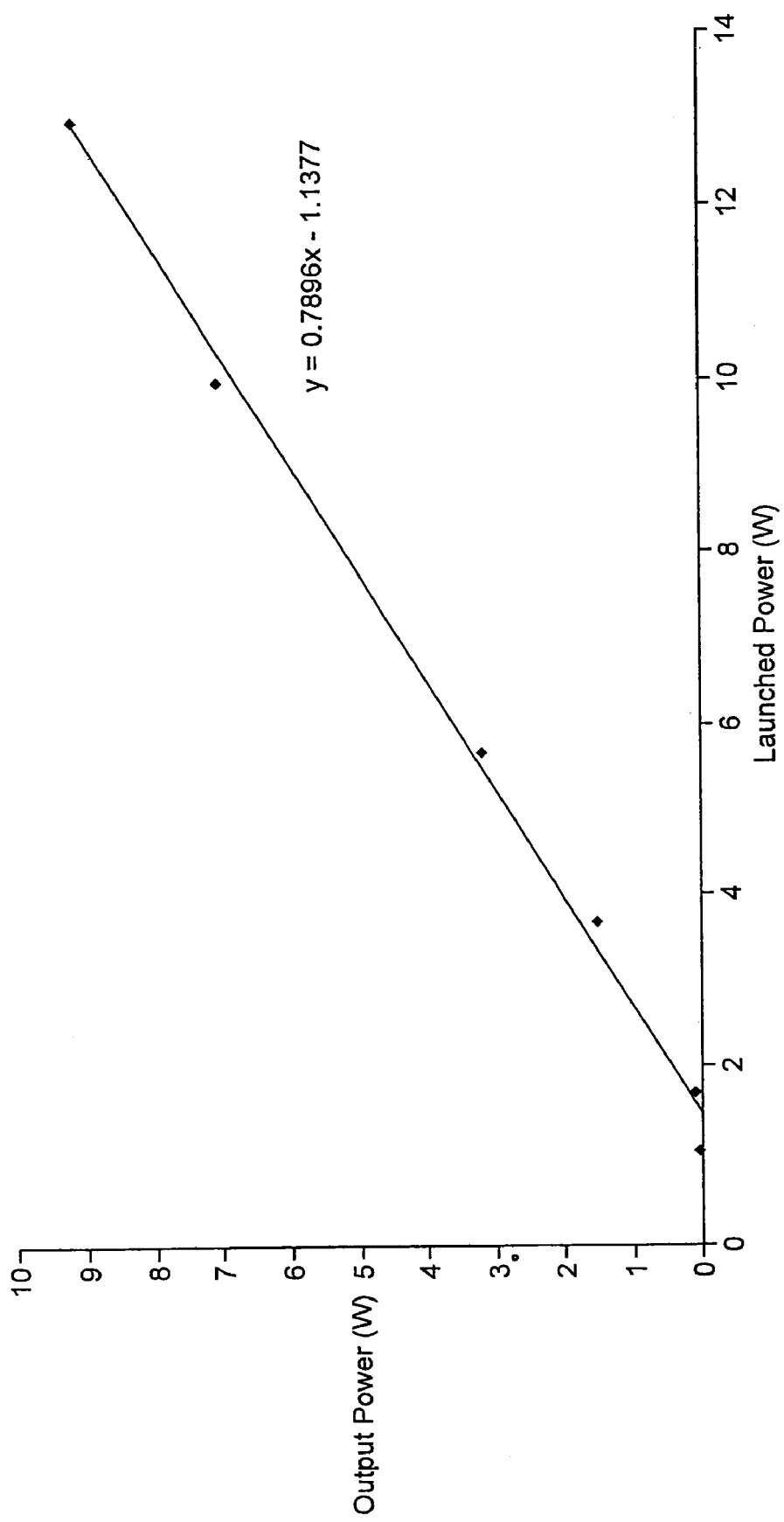
FIG. 8 is a graph of output power vs. lunched power for the optical fiber of FIG. 7.
Figure 9:
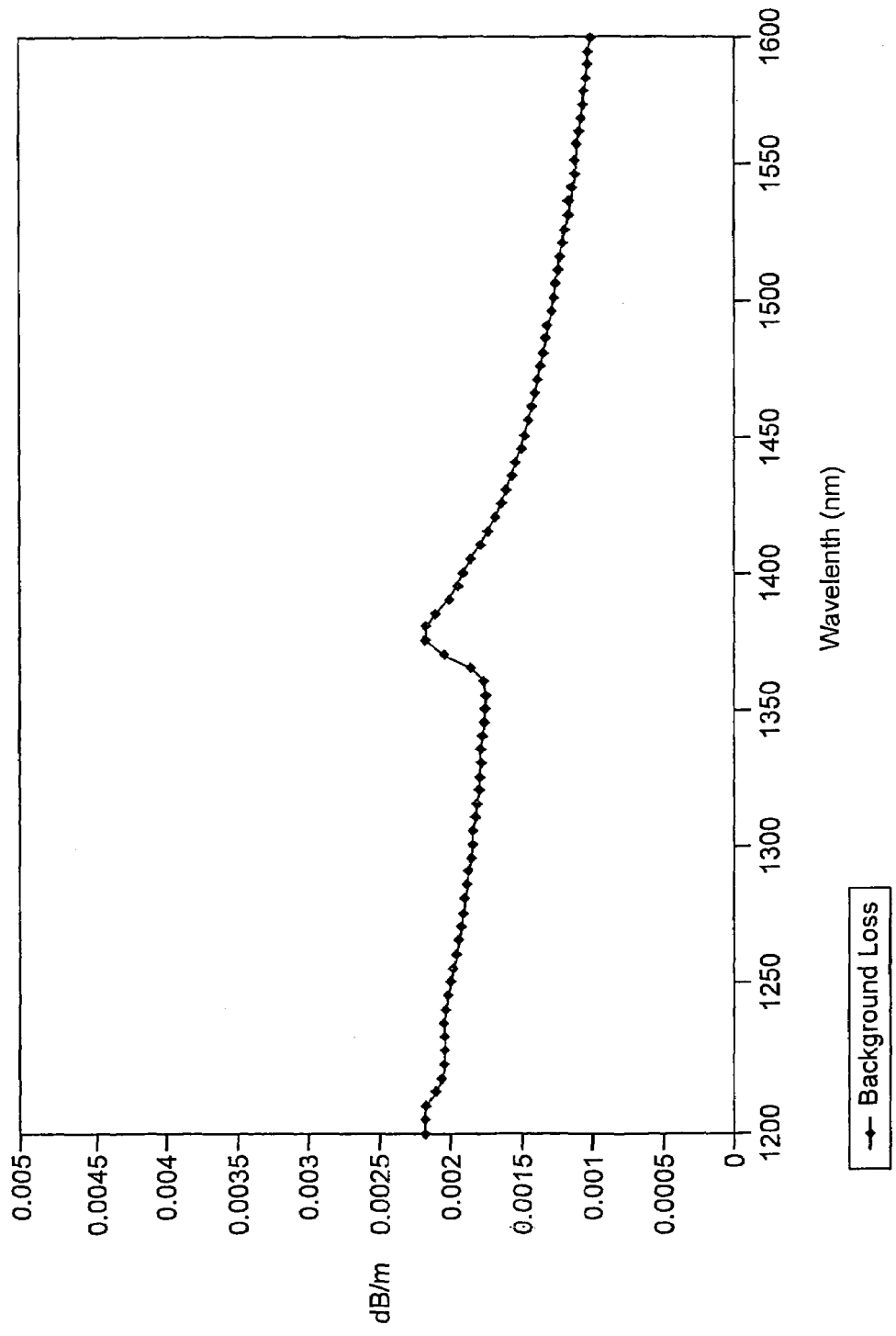
FIG. 9 is a graph illustrating passive core loss vs. wavelength of the optical fiber of FIG. 7.

The double clad optical fiber illustrated in FIG. 7 is also suitable for use in a fiber laser device. FIGS. 8 and 9 correspond to the optical fiber of FIG. 7. More specifically, FIG. 8 illustrates fiber-laser efficiency of this optical fiber. The fiber laser shows low threshold (about 1.5 Watts) and high lasing efficiency of 78% (as defined by the graph's slope). The optical fiber has good power-handling capability with power of over 10 Watts. FIG. 9 illustrates the low passive loss, for example less than 2 dB/km at 1280 nm, achieved in the Yb-doped core of the fiber of FIG. 7.

The specific composition for the optical fiber of the second example is:

Core 12: 0.8wt % $Yb_2O_3$; 9.5wt % $P_2O_5$; 5.4Wt % $GeO_2$;
Inner cladding 14: Pure Silica;
Outer cladding 16: 2.3 Wt % F.

Example 3

Figure 10:
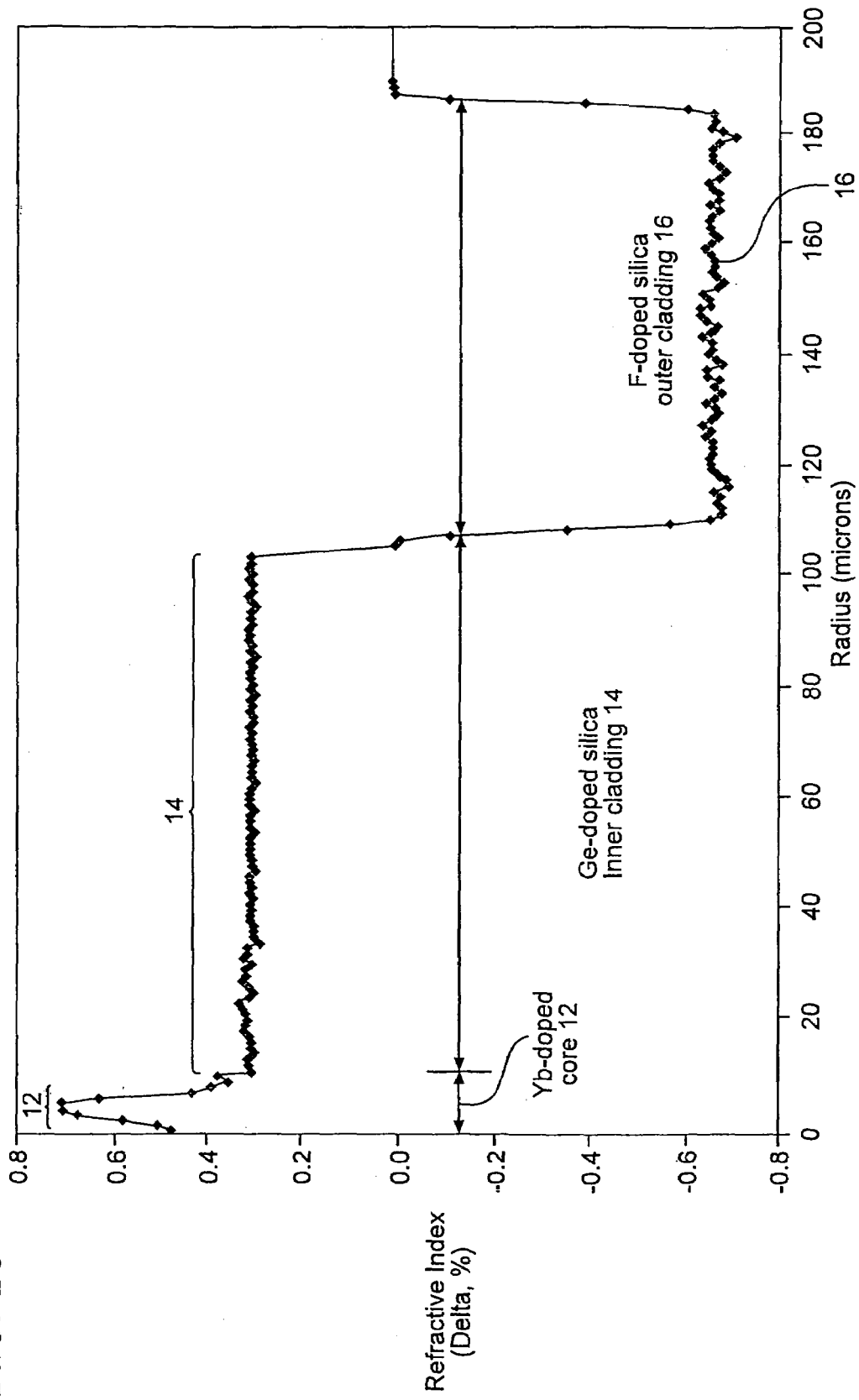
FIG. 10 is a refractive index profile of a third example of the optical fiber of the present invention.

FIG. 10 illustrates a refractive index profile of a third exemplary optical fiber of the present invention. This optical fiber has a Yb doped core 12, a silica based, Ge doped inner cladding 14 with the relative refractive index (% delta %) of 0.3 and an outer cladding 16 which is doped with Fluorine. FIG. 10 shows that the refractive index difference (% delta) of the core 12 is about 0.7 and that the fluorine doped outer cladding 16 has the refractive index % delta of about −0.7. The specific composition for this optical fiber example is:

Core 12: 0.8wt % $Yb_2O_3$; 9.5wt % $P_2O_5$; 5.4Wt % $GeO_2$;
Inner cladding 14: 6 Wt % $GeO_2$;
Outer cladding 16: 2.3 Wt % F It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An active optical fiber comprising:
    (i) a silica based, rare earth doped core having a first index of refraction $n_1$;
    (ii) a silica based inner cladding surrounding the core, said inner cladding having (a) a second index of refraction $n_2$, such that $n_1 \leq n_2$; and (b) a numerical aperture NA between 0.15 and 0.5; and (iii) a solid, silica based outer cladding without microstructures, said outer cladding surrounding the first cladding having a third index of refraction $n_3$; the outer cladding further comprising an index lowering dopant, such that $n_2 \leq n_3$, wherein the inner cladding diameter is at least 125 μm.

2. The optical fiber of claim 1, wherein said rare earth dopant is Yb.

3. The optical fiber of claim 1, wherein said rare earth dopant is Er.

4. The optical fiber of claim 1, wherein the core includes, in weight percent:

| | |
|---|---|
| Yb | 0.1 to 2.5 wt %; |
| P | 0 to 5% wt % |
| Al | 0 to 15 wt %; |
| Ge | 0 to 15 wt %; and |
| F | 0 to 1 wt %. |

5. The optical fiber of claim 4, wherein the index lowering dopant of said outer cladding comprises Fluorine and/or Boron.

6. The optical fiber of claim 4, wherein the inner cladding includes an index raising dopant.

7. The optical fiber of claim 6, wherein the index raising dopant of the inner cladding includes Ge.

8. The optical fiber of claim 7, wherein the index raising dopant of the inner cladding includes 0 to 20 wt % of Ge.

9. The optical fiber of claim 4, wherein the index lowering dopant of said outer cladding comprises Fluorine and/or Boron, in weight percent:

| | |
|---|---|
| F | 0 to 4 wt %; |
| B | 0 to 20 wt %. |

10. The optical fiber of claim 1, wherein the outer cladding includes Fluorine and/or Boron, in weight percent:

| | |
|---|---|
| F | 0 to 4 wt %; |
| B | 0 to 20 wt %. |

11. The optical fiber of claim 1, wherein the inner cladding includes Germanium, in weight percent:

| | |
|---|---|
| Ge | 0 to 20 wt %. |

12. The optical fiber of claim 1, wherein the core is circular and the core diameter is 9 to 30 μm.

13. The optical fiber of claim 1, wherein the inner cladding diameter is 125 μm to 350 μm and the outer cladding diameter is 145 μm to 500 μm.

14. The optical fiber of claim 13, wherein the outer cladding has a wall thickness of less than 35 μm.

15. The optical fiber of claim 13, wherein the outer cladding has a wall thickness of 10 μm to 25 μm.

16. The optical fiber of claim 1, wherein silica based inner cladding has numerical aperture between 0.15 and 0.45.

17. The active optical fiber according to claim 1, wherein said inner cladding's numerical aperture NA is between 0.15 and 0.45.

18. The optical fiber of claim 17 wherein said numerical aperture NA is between 0.3 and 0.4.

19. The optical fiber of claim 17 wherein said inner cladding comprises 5 wt % to 20 wt % Ge, and said outer cladding comprises fluorine and/or boron, in the following concentration: 0 to 4 wt % F and 0 to 20 wt % B.

20. An active optical fiber comprising:
(i) a silica based, rare earth doped core having a first index of refraction $n_1$;
(ii) a silica based inner cladding surrounding the core, said inner cladding having (a) a second index of refraction $n_2$, such that $n_1 > n_2$; and (b) a numerical aperture NA between 0.15 and 0.5; and
(iii) a silica based outer cladding surrounding the first cladding having a third index of refraction $n_3$; the outer cladding further comprising an index lowering dopant, such that $n_2 > n_3$, wherein the inner cladding diameter is at least 125 μm, and wherein the core is elliptical and the core diameter (along the minor axis) is 5 μm to 50 μm.

21. The optical fiber of claim 20, wherein the core has an aspect ratio of at least 1.5 to 1.

22. The optical fiber of claim 20, wherein said first silica based cladding has a non-circular outer perimeter.

* * * * *

UNITED STATES PATENT AND TRADEMARK OFFICE
CERTIFICATE OF CORRECTION

PATENT NO. : 7,139,458 B2
APPLICATION NO. : 11/039041
DATED : November 21, 2006
INVENTOR(S) : Kon et al.

It is certified that error appears in the above-identified patent and that said Letters Patent is hereby corrected as shown below:

| No. | Col. | Line | Description |
|-----|------|------|-------------|
| 1 | 8 | 66 | $n_1 \leq n_2$ should be $n_1 > n_2$ |
| 2 | 9 | 5 | $n_2 \leq n_3$ should be $n_2 > n_3$ |

Signed and Sealed this

Twentieth Day of February, 2007

JON W. DUDAS
*Director of the United States Patent and Trademark Office*